United States Patent [19] [11] 3,942,262
Perry [45] Mar. 9, 1976

[54] DRYER TEMPERATURE CONTROL
[75] Inventor: Robert J. Perry, Houston, Tex.
[73] Assignee: Phillips Petroleum Company, Bartlesville, Okla.
[22] Filed: Dec. 5, 1973
[21] Appl. No.: 421,863

[52] U.S. Cl. .............................. 34/15; 34/40; 34/51; 34/235; 165/31
[51] Int. Cl.² ........................................... F26B 5/04
[58] Field of Search ............... 34/15, 17, 19, 40, 39, 34/51, 72, 235, 242, 54; 165/31, 34; 55/20

[56] References Cited
UNITED STATES PATENTS

| | | | |
|---|---|---|---|
| 2,691,830 | 10/1954 | Karnofsky | 34/44 |
| 3,054,193 | 9/1962 | Wright | 34/54 |
| 3,152,872 | 10/1964 | Scoggin et al. | 34/15 |
| 3,251,137 | 5/1966 | Alleman | 34/39 |
| 3,310,881 | 3/1967 | Fritzberg | 34/15 |
| 3,384,974 | 5/1968 | Alleman et al. | 34/31 |
| 3,396,476 | 8/1968 | Eaves | 34/31 |
| 3,448,969 | 6/1969 | Windsor | 34/242 |
| 3,482,327 | 12/1969 | Dutcher | 34/54 |
| 3,631,605 | 1/1972 | Wylie | 34/17 |
| 3,787,985 | 1/1974 | Fowler et al. | 34/31 |

FOREIGN PATENTS OR APPLICATIONS
875,683   8/1961   United Kingdom ................... 34/54

Primary Examiner—Albert W. Davis, Jr.
Assistant Examiner—Paul Devinsky

[57] ABSTRACT

A slurry of particulate material, such as polypropylene, and a fluid, such as propylene diluent, is introduced into a flash tank to remove a substantial amount of the fluid. The resulting particulate material is passed from the flash tank through a heated dryer to elevate the temperature of the particulate material and remove additional fluid. The temperature of the particulate material removed from the dryer is controlled by measuring the temperature of the removed material and adjusting the rate at which vapor is removed from the dryer in response to the measured temperature.

10 Claims, 1 Drawing Figure

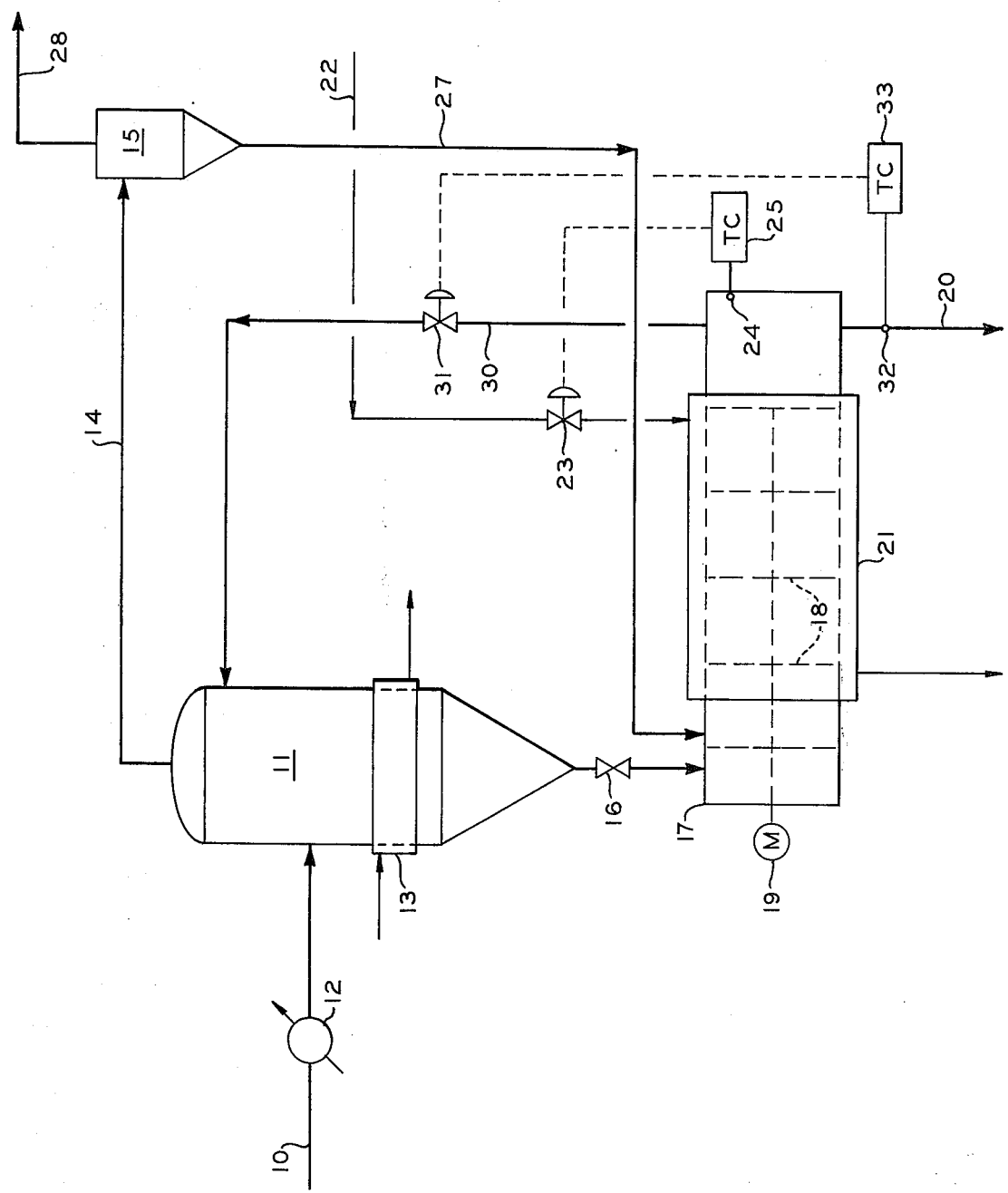

DRYER TEMPERATURE CONTROL

In the production of polymeric materials, the reactor effluent often comprises the polymer dissolved or entrained in a diluent. In the production of polypropylene, for example, this diluent can be propylene and the reactor effluent can comprise a slurry of the polymer in the diluent. The diluent is usually removed by means of a flash tank, and the resulting polymer is dried and ultimately purged of any residue diluent. One procedure employed heretofore has been to pass the polymer from the flash tank through a heated conveyor dryer.

In the operation of a polymer recovery system of the type described, control of dryer temperature has been a serious problem. If the temperature of the polymer becomes too high, chunks of fused polymer may form, and the motor which rotates paddles in the dryer may overheat. While the temperature of the dryer can be regulated to some extent by controlling the external heat supplied to the dryer, such control often does not respond fast enough to eliminate the problem of polymer chunks being formed. In view of the fact that the polymer concentration in the feed slurry may vary during a production run, it is usually not possible to maintain precise temperature control of the flash tank.

In accordance with this invention, the temperature of the particulate material removed from a dryer is controlled from a measurement of the temperature of the material removed from the dryer. The rate at which vaporizable fluid removed from the material being dried is vented from the dryer is controlled in response to the measured temperature so as to maintain the measured temperature at a preselected value. The removed fluid can be recycled to the flash tank and withdrawn from the system with the remainder of the vapor.

The accompanying drawing is a schematic illustration of polymer recovery apparatus having the apparatus of this invention incorporated therein.

In the illustrated embodiment, a polymer slurry is introduced through a conduit 10 which communicates with a flash tank 11. A heater 12 is associated with conduit 10 to elevate the temperature of the slurry. Flash tank 11 is provided with a jacket 13 through which a heating fluid is circulated. The flashed vapor is removed from the top of tank 11 through a conduit 14 which communicates with a cyclone separator 15. Polymer is removed from the bottom of the flash tank through a valve 16 and passed to the inlet of a dryer 17. Dryer 17 is provided with a series of paddle wheels 18 or other elements which are rotated by motor 19 to convey the polymer from the inlet end to the outlet end from which it is removed through a conduit 20. Dryer 17 is provided with a jacket 21 through which a heating fluid, such as steam, is circulated. This steam can be introduced through a conduit 22 which has a control valve 23 therein. A temperature sensing element 24 is positioned near the outlet of the dryer to measure temperature of the withdrawn polymer. A signal from this element is applied to a temperature controller 25 which adjusts valve 23 in response to the measured temperature. Thus, the flow of steam through jacket 21 is adjusted to tend to maintain a desired temperature at the outlet end of the dryer.

Any polymer entrained in the overhead vapors from the flash tank 14 is removed from cyclone separator 15 and passed a dryer 17 through a conduit 27. The flashed vapor removed from the top of separator 15 is passed through a conduit 28 for recycle to the polymerization process.

In accordance with this invention, vapor removed from the polymer in dryer 17 is withdrawn from the dryer at a controlled rate through a conduit 30 which communicates with the upper region of flash tank 11. A control valve 31 is positioned in conduit 30. A temperature sensing element 32 is disposed in conduit 20 adjacent the outlet end of dryer 17 or in the outlet end of the dryer itself to measure the temperature of the polymer removed from the dryer. Element 32 is connected to a temperature controller 33, the output of which is applied to control valve 31. Temperature controller 33 is a conventional control instrument which compares the measured temperature with a desired setpoint temperature and establishes an output signal representative of any difference therebetween. This output signal controls the opening of valve 31 to tend to maintain the temperature of the dried polymer at a preselected value. While such automatic control is highly desirable, it is also possible for valve 31 to be controlled manually in response to an operator observing the temperature measured by element 32.

As an example of a specific embodiment of this invention, a slurry of polypropylene in propylene is introduced through conduit 10 at a rate in the order of 4,000 to 5,000 pounds per hour. This slurry contains 40 to 50 weight percent polypropylene. The slurry is introduced into flash tank 11 at at a temperature of about 150° F. Sufficient heat is applied to the jacket of the flash tank to maintain such a temperature within the tank. The temperature of the polymer introduced into the inlet dryer 17 is approximately 148° F. It is desired to maintain the temperature of the polymer removed from the dryer in the range of about 210° to 220° F. Steam at a temperature of 285° to 300° F. is introduced through conduit 22 at a rate sufficient to provide the desired elevation in temperature of the polymer passing through the dryer. The opening of valve 31 is manipulated so as to maintain the temperature of the polymer removed from dryer 17 at the desired value. Conduit 30 can have a diameter of three inches in the example, as can valve 31 in a fully open position. When the measured temperature rises above the desired value, valve 31 is moved toward a closed position. When the measured temperature falls, the valve is moved toward an open position. In the operation described, the overhead stream from flash tank 11 contains approximately 98 to 99 percent propylene. The small amount of entrained polymer is recycled through conduit 27.

While this invention has been described in conjunction with the removal of diluent from polypropylene, it should be evident that the invention is applicable to the drying of any particulate material wherein it is desirable to remove volatile fluid therefrom by the application of heat. Thus, while the invention has been described in conjunction with a presently preferred embodiment, it is not limited thereto.

What is claimed is:

1. A method of drying particulate material to remove volatile fluid therefrom comprising passing the material through a heated dryer, venting vaporized fluid from the dryer, measuring the temperature of the particulate material removed from the dryer, and controlling the rate at which the fluid is vented so as to maintain the measured temperature at a preselected value, said fluid being vented at an increased rate when the measured temperature falls below a preselected value and being vented at a decreased rate when the measured temperature rises above the preselected value.

2. The method of claim 1 in which the particulate material is polypropylene and the volatile fluid is propylene.

3. The method of claim 1 in which the dryer is heated by passing a heating fluid in indirect heat exchange relationship with the dryer.

4. The method of claim 3, further comprising measuring the temperature of the particulate material in the dryer, and controlling the rate at which the heating fluid is passed so as to maintain the measured temperature of the material in the dryer at a preselected value.

5. The method of claim 1 wherein a feed stream of said particulate material and volatile fluid is introduced into a flash chamber so that a major part of the volatile fluid contained in said feed stream is flashed, the flashed fluid is withdrawn from the flash chamber, and the particulate material containing the remainder of the volatile fluid is the material passed through the heated dryer.

6. The method of claim 5 wherein the vaporized fluid vented from the dryer is passed to the flash chamber.

7. Apparatus for drying particulate material comprising a dryer having an inlet and an outlet, conduit means communicating with said dryer to remove gases evolved from the particulate material, a valve in said conduit means, temperature sensing means positioned to measure the temperature of particulate material removed from the dryer, and control means responsive to said temperature sensing means to regulate the flow of gases through said conduit means, said control means moving said valve toward an open position when the measured temperature falls below a preselected value and moving said valve toward a closed position when the measured temperature rises above the preselected value.

8. The apparatus of claim 7, further comprising means to supply heat to said dryer, a second temperature sensing means positioned to measure the temperature of particulate material in the dryer, and means responsive to said second temperature sensing means to control said means to supply heat to said dryer.

9. The apparatus of claim 7, further comprising a flash tank having an inlet, a first lower outlet to remove particulate material and a second upper outlet to remove gases, and means connecting said first outlet to the inlet of said dryer.

10. The apparatus of claim 9 wherein said conduit means is connected to said flash tank to convey gases from said dryer to said flash tank for removal through said first inlet.

* * * * *